United States Patent
Xie et al.

(10) Patent No.: US 12,170,491 B2
(45) Date of Patent: Dec. 17, 2024

(54) CIRCUIT ARRANGEMENT AND METHOD FOR GENERATING AN AC VOLTAGE

(71) Applicant: SAX Power GmbH, Erbach (DE)

(72) Inventors: Anya Xie, Ulm (DE); Boyang Li, Ulm (DE)

(73) Assignee: SAX Power GmbH, Erbach (DE)

( * ) Notice: Subject to any disclaimer, the term of this patent is extended or adjusted under 35 U.S.C. 154(b) by 0 days.

(21) Appl. No.: 18/685,249

(22) PCT Filed: Aug. 22, 2022

(86) PCT No.: PCT/EP2022/073305
§ 371 (c)(1),
(2) Date: Feb. 21, 2024

(87) PCT Pub. No.: WO2023/025715
PCT Pub. Date: Mar. 2, 2023

(65) Prior Publication Data
US 2024/0333174 A1 Oct. 3, 2024

(30) Foreign Application Priority Data

Aug. 23, 2021 (EP) .................................. 21192613

(51) Int. Cl.
*H02M 7/49* (2007.01)
*H02M 1/00* (2006.01)
*H02M 7/5387* (2007.01)

(52) U.S. Cl.
CPC ........... *H02M 7/49* (2013.01); *H02M 1/0009* (2021.05); *H02M 1/007* (2021.05); *H02M 1/0083* (2021.05); *H02M 7/53871* (2013.01)

(58) Field of Classification Search
CPC .. H02M 1/0009; H02M 1/007; H02M 1/0083; H02M 7/53871; H02M 7/539
See application file for complete search history.

(56) References Cited

U.S. PATENT DOCUMENTS 9,197,140 B2 * 11/2015 Nowak .................. H02M 7/537
2008/0054726 A1 * 3/2008 Chang .................. H02J 7/0068
307/82

(Continued)

FOREIGN PATENT DOCUMENTS

DE 102011004248 A1 8/2011
DE 102014215773 A1 2/2016

(Continued)

OTHER PUBLICATIONS

J. Qi, D. Lu., "Review of Battery Cell Balancing Techniques", Australasian Uiversities Power Engineering Conference, AUPEC 2014, Curtin University, Perth, Australia, Sep. 28 Oct. 1, 2014—Abstract only available.

(Continued)

*Primary Examiner* — Yusef A Ahmed
(74) *Attorney, Agent, or Firm* — Dickinson Wright PLLC

(57) ABSTRACT

A circuit arrangement for generating an AC voltage has at least one modular inverter including a cascade of inverter units, a control device for controlling the inverter units, and a data transmission system for signal transmission between the control device and the inverter units. Each of the inverter units is connected to a respective DC voltage source, has a control input and a data output and is configured, depending on control signals received from the control device via the control input, to make the respective DC voltage source available on the output side for generating the AC voltage. The data transmission system has a control line and at least one data line each connected to the control device. The control line is connected to the control inputs of the inverter units and the at least one data line is connected to the data outputs of the inverter units.

12 Claims, 3 Drawing Sheets

(56) References Cited

U.S. PATENT DOCUMENTS

| | | | |
|---|---|---|---|
| 2008/0143188 A1* | 6/2008 | Adest | H02M 7/42 307/82 |
| 2008/0164766 A1* | 7/2008 | Adest | H02J 1/12 323/299 |
| 2011/0012430 A1* | 1/2011 | Cheng | H02J 3/40 307/82 |
| 2011/0084553 A1* | 4/2011 | Adest | H02J 3/381 307/63 |
| 2012/0313443 A1* | 12/2012 | Cheng | H02J 3/46 363/95 |
| 2013/0147269 A1* | 6/2013 | Zimmermann | H05B 45/382 315/86 |
| 2013/0155736 A1* | 6/2013 | Ilic | H02M 7/72 363/71 |
| 2013/0187473 A1* | 7/2013 | Deboy | H02M 7/49 307/82 |
| 2014/0254229 A1* | 9/2014 | Kopf | H02M 7/539 363/132 |
| 2015/0016161 A1* | 1/2015 | Tanaka | H02J 3/381 363/71 |
| 2016/0126862 A1* | 5/2016 | Vahedi | H02M 7/537 363/131 |
| 2017/0250622 A1* | 8/2017 | Krolak | H02J 1/14 |
| 2018/0123496 A1* | 5/2018 | Ilic | H02J 7/0013 |
| 2018/0241319 A1* | 8/2018 | Bando | H01L 25/18 |
| 2018/0269775 A1* | 9/2018 | Sadilek | H02J 3/01 |
| 2019/0081475 A1* | 3/2019 | Strandberg | H02J 1/12 |
| 2019/0288526 A1* | 9/2019 | Jaensch | H01M 10/425 |
| 2019/0288527 A1* | 9/2019 | Jaensch | H02J 7/0024 |
| 2020/0209317 A1* | 7/2020 | Ballantine | H01M 10/48 |
| 2021/0211066 A1* | 7/2021 | Vavilpalli | H02J 3/48 |
| 2022/0263311 A1* | 8/2022 | Holcombe | H02J 1/108 |
| 2023/0223761 A1* | 7/2023 | Shkoury | H02M 3/33569 307/63 |
| 2024/0213785 A1* | 6/2024 | Xie | H01M 10/441 |
| 2024/0235362 A1* | 7/2024 | Matteson | B60L 53/22 |

FOREIGN PATENT DOCUMENTS

| | | |
|---|---|---|
| DE | 102018003642 A1 | 11/2019 |
| KR | 20150078815 A | 7/2015 |

OTHER PUBLICATIONS

Marquez A et al., "Communications scheme of a modular power conversion system", 2015 IEEE International Conference on Industrial Technology (ICIT), IEEE, (20150317), doi:10.1109/ICIT.2015.7125546, pp. 3034-3039, XP032785465.

D'arco Salvatore et al., "Power and balancing control considerations on modular multilevel converters for battery electric vehicles", 2013 15th European Conference on Power Electronics and Applications (EPE), IEEE, (Sep. 2, 2013), doi:10.1109/EPE.2013.6634386, pp. 1-9, XP032505373.

Quraan Mahran et al., "Design and Control of Modular Multilevel Converters for Battery Electric Vehicles", IEEE Transactions on Power Electronics, Institute of Electrical and Electronics Engineers, USA, vol. 31, No. 1, doi:10.1109/TPEL.2015.2408435, ISSN 0885-8993, (Jan. 2016), pp. 507-517, (Sep. 21, 2015), XP011669908.

* cited by examiner

CIRCUIT ARRANGEMENT AND METHOD FOR GENERATING AN AC VOLTAGE

The present application is a U.S. National Phase Application of International Application No. PCT/EP2022/073305, filed on Aug. 22, 2022, which claims the priority of the European patent application No. 21 192 613.4, the contents of which is completely incorporated herein by way of reference.

The invention relates to a circuit arrangement for generating an AC voltage, comprising at least one modular inverter, which is in the form of a cascade of multiple inverter units, a control device for configuring the inverter units, and a data transmission system for signal transmission between the control device and the inverter units, according to the preamble of claim 1.

The invention further relates to a power supply system and an electrical load arrangement, in particular an electric vehicle or a household power grid.

The invention additionally relates to a method for generating an AC voltage by means of a modular inverter, which is in the form of a cascade of multiple inverter units, wherein each of the inverter units is connected to a dedicated DC voltage source.

In power supply systems, battery storage systems are sometimes used, such as photovoltaic home storage systems ("solar batteries") for storing surplus yield from photovoltaic systems, or drive batteries ("high-voltage storage systems") for supplying power to the electric motors or drive units of electric vehicles. Such battery storage systems sometimes require battery voltages of several hundred volts. However, since the cell voltage of a single battery cell is only a few volts (e.g. 3.7 V for a lithium-ion battery), many individual battery cells have to be connected in series to form a battery pack (hereinafter also referred to simply as a "battery").

Due to manufacturing factors, each battery cell of a battery exhibits differences in its properties, such as the cell capacity, self-discharge rate and temperature characteristics. Over time, these differences are further exacerbated by aging effects. As a result, some battery cells will have not yet reached their maximum charge level during charging, while other battery cells will be fully charged already. Overcharging the already fully charged battery cells can eventually result in damage to them or even destroy them. To prevent this, the charging process must be terminated prematurely.

The discharging process behaves in a similar way. While some battery cells are already completely discharged, other battery cells sometimes still have enough stored energy to continue to drive an electric vehicle, for example. In the example of the electric vehicle, driving operation would eventually have to be terminated prematurely, as otherwise the weaker battery cells would be deeply discharged, which can result in their being destroyed.

To ensure a smooth charging and discharging process, battery management systems (BMS) are used to balance the charge between the individual battery cells, see J. Qi, D. Lu., "Review of Battery Cell Balancing Techniques", Australasian Universities Power Engineering Conference, AUPEC 2014, Curtin University, Perth, Australia, Sep. 28 Oct. 1, 2014.

The most common method at the time of filing is so-called passive charge balancing. In this case, already fully charged battery cells are discharged via a resistor, while the other battery cells are charged further. An obvious disadvantage of this method is that valuable electrical energy is lost and that the method does not provide a solution for the discharge process either.

The problems with passive charge balancing can be resolved by means of active charge balancing. However, this technique requires complex circuits with power-electronics components and complicated control.

To generate three-phase voltages, e.g. for the electrical machines or electric motors in an electric vehicle, self-commutated inverters are often used. Typically, such an inverter consists of six power-electronics valves that are interconnected to form a three-phase bridge. In this "two-point inverter", the sinusoidal AC voltages are generated from pulsed voltages with three voltage levels $(0, \pm U_{DC})$. The level of the voltage pulses depends on the battery voltage $U_{DC}$ and is therefore constant. To generate AC voltages, the duration of the voltage pulses can be varied as an actuating element. It is usually calculated using the pulse width modulation (PWM) method. In this case, however, high interference voltages are found in the AC voltages in the superimposed frequencies. In order to reduce the harmonics of the voltage, it is known practise to increase the clock frequencies of the inverter. As a rule, the clock frequencies of a modern inverter are therefore in the range from several kHz to 100 kHz. However, the switching losses of the inverters increase in proportion to their clock frequency.

To avoid these problems, a modular inverter can be used, as proposed in DE 10 2011 004 248 A1, for example. In this technique, the individual battery cells are connected in series not directly, but via power-electronics H-bridge circuits. The principle may be suitable for single-phase loads, and even for three-phase loads. A three-phase modular inverter can be formed from two single-phase modular inverters connected in series, for example, as proposed in DE 10 2018 003 642 A1.

A significant challenge when generating an AC voltage from a multiplicity of individual DC voltage sources is closed-loop control and the communication that is thus necessary between a central open-loop and/or closed-loop control unit (hereinafter referred to as "control device") and the individual inverter units connected to the respective DC voltage sources.

The scientific publication Marquez A. et al.: "Communications scheme of a modular power conversion system", 2015 IEEE International Conference on Industrial Technology (ICIT), Mar. 17, 2015, pages 3034-3039, relates to a generic data bus system for a modular inverter. Specifically, an asynchronous master-slave communication system is proposed in which the individual inverter units respond to a call from the central control device by transmitting the respective requested data. Together with a further bus system for controlling the inverter units, the desired AC voltage can finally be generated. The proposed overall system requires a large number of individual lines, however, and is also severely limited in terms of achievable transmission speed, making it difficult to use for a large number of inverter units.

The switching states and nominal voltages of the individual DC voltage sources are preferably calculated by the control device, which then also needs to instruct or configure the inverter units as appropriate. To generate the AC voltage with a high level of accuracy, in particular to be able to also make use of extremely fine voltage steps, the applicable switching states, nominal voltage values and other commands need to be transmitted from the control device to the individual inverter units at high speed. To generate the AC voltage, the control device additionally requires state information from the individual DC voltage sources, in particular the most accurate possible information relating to the present state of charge of the DC voltage sources, which need to be transmitted—also at high speed—from the individual inverter units to the control device.

In order to generate the AC voltage with a high level of accuracy or with small voltage steps, there must be provision for a large number of DC voltage sources or inverter units. The data transmission system therefore not only needs to be suitable for bidirectional transmission at high data rates, but additionally needs to facilitate communication between a large number of communication partners.

The quality or standard of the generated AC voltage, that is to say the precision with which the generated AC voltage approximates a pure sinusoidal signal, is critically dependent on the communication capabilities between the control device and the inverter units and therefore substantially dependent on the technical features of the data transmission system. There is therefore a need for a suitable data transmission system for communication between a central control device and multiple inverter units for generating an AC voltage.

In light of the known prior art, the object of the present invention is to provide a circuit arrangement for generating an AC voltage that is able to generate the AC voltage to a particularly high standard or is able to approximate a pure sinusoidal signal as precisely as possible.

The present invention is also based on the object of providing a power supply system for generating an AC voltage from multiple DC voltage sources that is able to generate the AC voltage to a particularly high standard or is able to approximate a pure sinusoidal signal as precisely as possible.

Additionally, the object of the invention is to provide an electrical load arrangement whose primary load is supplied with an AC voltage that is generated from multiple DC voltage sources to a particularly high standard or is approximated to a pure sinusoidal signal as precisely as possible.

It is also an object of the invention to provide a method for generating an AC voltage from multiple DC voltage sources that can be used to generate the AC voltage to a particularly high standard or that can be used to approximate the AC voltage to a pure sinusoidal signal as precisely as possible.

The object is achieved for the circuit arrangement by the features presented in claim 1. The object is achieved in respect of the power supply system by the features of claim 10 and in respect of the electrical load arrangement by claim 11. The object is achieved in regard to the method by claim 12.

The dependent claims and the features described hereinafter relate to advantageous embodiments and variants of the invention.

There is provision for a circuit arrangement for generating an AC voltage, in particular for supplying electric power to an electrical load that can be connected to the circuit arrangement (hereinafter also referred to as "primary load").

The primary load may be able to be connected to the circuit arrangement by any means. For example, the circuit arrangement may have terminals in order to connect the primary load or an electrical line or busbar connected to the primary load. The circuit arrangement may in some cases also be able to be mechanically connected to the primary load, for example to a housing part of the primary load by force fit, form fit and/or material bond.

The primary load is preferably not intended to be understood as a component of the circuit arrangement.

The primary load may be any electrical load or even a group of multiple electrical loads. The primary load is preferably an electric motor, a drive unit and/or at least one electrical load within a low-voltage grid (in particular a household power grid).

The AC voltage generated by the circuit arrangement is preferably a single-phase AC voltage. However, there may also be provision for the circuit arrangement to generate a polyphase AC voltage, in particular a three-phase current. The AC voltage may be adjustable in amplitude, phase and/or frequency during operation (e.g. in order to specify a speed for an electric motor) or else may be constant (e.g. in order to operate an electrical household appliance).

According to the invention, the circuit arrangement comprises at least one modular inverter, which is in the form of a cascade of multiple inverter units.

The at least one inverter may thus be designed to generate the AC voltage. To this end, the inverter may have a first primary supply terminal and a second primary supply terminal, for example, between which the AC voltage is present. The electrical load to be operated, or the primary load, may then be able to be connected to the first primary supply terminal and to the second primary supply terminal, or may be able to be attached to said primary supply terminals.

A cascade of the inverter units is intended to be understood to mean in particular an output-side series arrangement formed by the inverter units.

In principle, there may be provision for any number of inverter units, for example up to 10 inverter units, up to 20 inverter units, up to 50 inverter units, up to 100 inverter units, up to 200 inverter units, up to 500 inverter units or even more inverter units.

It will be mentioned at this juncture that it is sometimes also possible, in principle, for inverter units to be connected up in parallel with other inverter units, for example in order to increase a maximum possible output current.

According to the invention, the circuit arrangement additionally has a control device for configuring the inverter units and a data transmission system for signal transmission between the control device and the inverter units.

The control device may be in the form of a microprocessor. Instead of a microprocessor, there may also be provision for any other device for implementing the control device, for example one or more arrangements of discrete electrical devices on a printed circuit board, a programmable logic controller (PLC), an application-specific integrated circuit (ASIC) or another programmable circuit, for example including a field programmable gate array (FPGA), a programmable logic array (PLA) and/or a commercially available computer. The control device may also arise as a combination of multiple electronic devices in a locally distributed arrangement within the circuit arrangement.

The control device may also be a functional module of a superordinate control unit, for example a functional module of the battery management system, mentioned hereinafter, of the DC voltage sources or of a control unit of the electrical load operated by the AC voltage.

According to the invention, each of the inverter units can be connected to at least one dedicated DC voltage source, has a control input and a data output and is designed to take control signals from the control device that are received via the control input as a basis for making the associated DC voltage source available (in some cases as either +$U_{DC}$ or −$U_{DC}$) on the output side for generating the AC voltage or unavailable.

The connection between a respective inverter unit and the at least one DC voltage source can be made for example by way of appropriate supply lines and/or busbars. However, there may also be provision for a direct link to the DC voltage source(s). The circuit arrangement may in some cases also be able to be mechanically connected to the at least one DC voltage source, for example to a housing part of the at least one DC voltage source (e.g. a housing part of a battery) by force fit, form fit and/or material bond.

The at least one DC voltage source is preferably not intended to be understood as a component of the circuit arrangement.

The DC voltage source may in particular be a single battery cell of a battery or may be a group ("battery module") of multiple interconnected battery cells of a battery. The DC voltage source may in some cases also be a complete battery or a combination of multiple batteries, however.

A "battery" is intended to be understood in the present case to mean both a rechargeable storage device (that is to say an "accumulator"/"battery pack"), the individual cells of which are also called "secondary cells", and a non-rechargeable storage device. A battery or battery pack may in some cases also comprise only a single battery cell. The present invention is therefore intended to be understood as being not necessarily limited to batteries having multiple interconnected battery cells. In addition, a battery in the present description can also mean a storage device for electrical energy that is not or not exclusively electrochemical in design, e.g. a capacitor.

In principle, however, the DC voltage source may be any DC voltage source, that is to say, for example, also a DC voltage provided by an electronic assembly, for example may be a DC voltage provided on the output side by a rectifier and/or a DC chopper. For simplification, the DC voltage sources are referred to hereinafter and hereinbefore essentially as battery cells of a common battery, which is not intended to be understood as limiting, however, but only as an example.

According to the invention, the individual DC voltage sources, that is to say e.g. individual battery cells, can be connected in series by way of the individual inverter units as required. The oscillating output voltage of the inverter can therefore be generated using summed individual voltages of the individual DC voltage sources, said individual voltages being in a staircase pattern with small steps. The level of the smallest voltage step can correspond to the output voltage of the respective DC voltage source (e.g. the cell voltage of a battery cell, such as 3.7 V).

The cascaded inverter units allow the otherwise necessary high clock frequencies of a pulse-width-modulated output voltage and the associated switching losses to be greatly reduced.

It is advantageously additionally possible to use DC voltage sources of different ages or in different states and of different type in the same power supply system, since they may be flexibly combinable. The great flexibility additionally allows the period of use, for example of a battery block of a photovoltaic home storage system or of a high-voltage storage system of an electric vehicle, to be significantly extended.

According to the invention, the data transmission system has a control line connected to the control device and at least one data line connected to the control device. The control line is connected to the control inputs of the inverter units and the at least one data line is connected to the data outputs of the inverter units. The inverter units are designed to use the at least one data line to transmit state information relating to the respective associated DC voltage source to the control device. By contrast, the control device is designed to transmit the control signals to configure the inverter units on the basis of the received state information.

The control line can therefore be used to transmit information and control signals from the control device to all the inverter units simultaneously. All the necessary information for control for generating the AC voltage can be combined by the control device and sent to the inverter units as a data block. By contrast, the data transmission from the inverter units to the control device can take place via the at least one data line, the at least one data line preferably being used by only one inverter unit to transmit data at a specific time, preferably only at the request of the control device.

The aforementioned state information may in particular be information relating to the present state of charge, to the present temperature and/or to the present "state of health" of the DC voltage source.

The DC voltage sources may each have a control module or a common control module that collects the state information relating to the individual DC voltage sources, for example using suitable sensors (temperature sensors, ammeters and/or voltmeters, etc.) and/or that reads the state information from a separate electrical circuit. The at least one control module can transfer the applicable state information to the inverter unit for further processing and/or transmission to the control device. The control module may in particular be a battery management system of a battery. A battery management system can be used to monitor and/or control the battery (sometimes also referred to as a power management system (PMS)) and can use analog and/or digital means to transmit information about the present state (for example state of charge and/or temperature status) and/or design or characteristic parameters (e.g. rated voltage, end-of-charge voltage and/or identification data) relating to the respective battery and the battery cells thereof.

The control line is preferably provided for unidirectional signal transmission from the control device to the inverter units, and the at least one data line is provided for unidirectional data transmission from the individual inverter units to the control device.

Overall, the two (unidirectional) transmission paths, that is to say the control line on the one hand and the at least one data line on the other, can be used to provide an advantageous bidirectional signal and data transmission.

The proposed data transmission system can be used to provide a fast data transmission just with a few electrical lines between the communication partners.

Finally, the data transmission system is used to propose an advantageous data bus system in which the control device may be in the form of a master and the inverter units may be in the form of slaves. The prior art admittedly discloses various data bus systems, such as for example SPI (Serial Peripheral Interface) buses or CAN (Controller Area Network) buses. However, none of the known data bus systems is readily suitable for the present use as a data transmission system between the present control device and the inverter units to generate an AC voltage of particularly high quality, in particular because extremely accurate synchronization of the individual inverter units or slaves with the control device or the master may be required in the present case.

The control device and/or the inverter units may have respective data processing modules that coordinate or prompt the communication, forwarding of data and signals and in particular the configuration of the inverter units (for example the connection and/or disconnection of the DC voltage sources).

There may be provision for the inverter or the inverter units thereof to be designed to adjust amplitudes, phases and/or frequencies on the output side, for providing the AC voltage, as specified by the control device. The inverter or the inverter units thereof may therefore be flexibly configurable as specified by the control device, for example in order to specify, control and/or regulate the operating behavior of a primary load.

In one refinement of the invention, there may in particular be provision for the inverter units to each have an H-bridge circuit comprising four power-electronics switching elements that are configurable by the control device. For an exemplary embodiment of such an H-bridge circuit, reference will be made to DE 10 2018 003 642 A1, the disclosure content of which is completely incorporated in the present description by way of this reference.

By way of example, two of said power-electronics switching elements in each case may have their outputs connected to form a series arrangement and may form a respective common connecting path of the H-bridge circuit. There may be provision for two such connecting paths. In each of the two connecting paths, the power-electronics switching elements may have an output of the inverter unit attached between them. The respective ends of the connecting paths may be connected to one another, an input of the inverter unit being attached at each end; the two connecting paths may therefore be connected in parallel. The output voltage of each inverter unit can preferably assume one of three voltage values (0, $\pm U_{DC}$), depending on the wiring of the H-bridge.

There may be provision for the configurable power-electronics switching elements to be in the form of bipolar transistors or preferably in the form of MOSFETs. In principle, however, any switching elements, in particular semiconductor components, can be used. The configurable power-electronics switching elements may also be in the form of relays. The design of the configurable power-electronics switching elements is nonlimiting for the invention, in principle.

In one advantageous development of the invention, there may be provision for the control device to be designed to generate the AC voltage from the individual voltages of the DC voltage sources (preferably in steps or at least approximately in steps) by configuring, in particular cyclically configuring, the inverter units via the control line.

The control device may further be designed to load the inverter units differently on the basis of a respective state of charge of the applicable DC voltage source, which is transferred to the control device as state information, with the aim of charge balancing between the DC voltage sources.

Since the individual DC voltage sources can each be connected or disconnected by way of a separate inverter unit, charge balancing between the DC voltage sources, that is to say for example between multiple battery cells, is possible.

By way of example, there may be provision for DC voltage sources having a higher state of charge than other DC voltage sources to be involved in generating the AC voltage more often and/or for longer than the other DC voltage sources, as a result of which the states of charge of all the DC voltage sources are aligned with one another over time.

According to one development of the invention, the control device may additionally also be designed to at least temporarily or intermittently exclude the inverter units from generation of the AC voltage on the basis of a respective state of charge, temperature state and/or fault state of the applicable DC voltage source, which is transferred to the control device as state information.

By way of example, faulty or overheated DC voltage sources can be excluded. In particular, deeply discharged battery cells can also be excluded.

By way of example, in the event of permanent or temporary failure of DC voltage sources, the inverter can continue to be operated using the DC voltage sources that are still operational. The availability of a corresponding power supply system may therefore be much higher than with the conventional technique of direct and naturally inflexible series arrangement of the DC voltage sources.

Defective DC voltage sources, for example defective battery cells, can be switched off and bypassed. This not least also provides the option of safely changing these DC voltage sources even during operation.

According to one development of the invention, there may be provision for the inverter units to be designed to transmit the state information only at the request of the control device.

The control device may be designed to request the state information of a respective inverter unit by transmitting a unique identifier associated with the applicable inverter unit, in particular via the control line (but in some cases also via a further line, for example the synchronization line mentioned hereinafter or even via a wireless communication channel).

In one development of the invention, there may be provision for the inverter units to each have an output switching element that is connected to the data line via the data output and that is able to put the data output into a high-impedance state if the applicable inverter unit does not transmit state information.

The output switching element can be used to avoid conflicts between logic or binary states (0/1) on the data line particularly easily. By way of example, there may be provision for output switching elements that involve the known output wirings "open-collector", "open-drain" or "tri-state".

According to a first variant of the invention, there is provision for the data transmission system to additionally have a clock generator line connected to the control device and all the inverter units.

Preferably, the control device is designed to generate a clock signal for synchronizing the signal transmission between the control device and the inverter units on the clock generator line. In principle, however, the clock signal does not necessarily have to be generated by the control device, but rather may also be generated by another electrical unit or assembly, for example by one of the inverter units.

At this juncture, it will be mentioned that a clock generator line or a clock signal is not absolutely necessary for synchronizing the signal transmission between the control device and the inverter units. In principle, the communication can also be realized asynchronously. There may also be provision for a clock recovery method.

The use of a clock generator line with an appropriate clock signal is particularly preferred because this allows the transmission speed and reliability of the data and signal transmission to be increased. In particular the use of a clock signal may allow clocking at frequencies above 1 MHz to be realized.

According to a second variant of the invention, which is provided as an alternative or in addition to the first variant of the invention, the data transmission system additionally has a synchronization line connected to the control device and to all the inverter units.

The control device may be designed to generate a synchronization signal on the synchronization line. In principle, however, the synchronization signal does not necessarily have to be generated by the control device, but can also be generated by another electrical unit or assembly, for example by one of the inverter units.

The synchronization signal can be used to facilitate accurate synchronization of all the inverter units, in order to generate the AC voltage to a particularly high standard or approximate it to a sinusoidal voltage having particularly low harmonics.

The inverter units may therefore be designed to synchronize a changeover time, at which an output-side voltage change on the respective inverter unit takes place while the AC voltage is being generated, with reception of the synchronization signal, or to make it directly dependent on the time of reception of the synchronization signal.

The synchronization signal can optionally additionally be used to identify the start and end of a data block transmitted from the control device to the inverter units by means of the control line.

Furthermore, the inverter units may optionally be designed to transmit requested data packets in sync with the synchronization signal on the data line.

Preferably, the data transmission system has not only the control line and the at least one data line but also the clock line and the synchronization line. Therefore at least four lines may preferably be realized.

In one development of the invention, there may be provision for the control device and the inverter units to have respective potential-isolating elements in order to facilitate signal transmission via the control line, the at least one data line, the clock generator line and/or the synchronization line in isolated fashion and based on different voltage levels.

On account of the generally different voltage potentials of the individual DC voltage sources (the voltage potentials may sometimes differ by over one hundred volts), it may be advantageous to produce the data transmission system in isolated form and in particular with a high isolation voltage.

The potential isolation can additionally significantly improve immunity toward inductive and capacitive couplings, in particular if floating leads with twofold potential isolation are used (that is to say at both ends or at all connection points of the respective lead).

The potential-isolating elements allow DC isolation to be achieved that blocks the flow of current between the line ends and simultaneously facilitates unimpeded data transfer. The proposed electrical isolation may be advantageous in particular to protect against voltages or currents that are caused by overvoltages or ground loops, in particular because system groundings isolated by particularly long lines sometimes do not have the same potential, which means that ground currents that can adversely affect signal quality can flow between the line ends. The proposed isolation therefore improves the data transmission further.

The potential-isolating elements are preferably digital isolators, transformers, coupling capacitors and/or optocouplers.

In one advantageous development of the invention, there may be provision for multiple instances of the inverter units to be combined to form a common module group.

Preferably, the circuit arrangement has multiple instances of said module groups, for example at least two module groups, preferably up to 5 module groups or more module groups, for example up to 10 module groups, up to 20 module groups, up to 50 module groups, up to 100 module groups, up to 200 module groups, up to 500 module groups or even more module groups.

There may be provision for each of the module groups to have the same number of inverter units. This is not absolutely necessary, however. By way of example, the module groups may each have precisely 2 inverter units, may each have up to 5 inverter units, may each have up to 10 inverter units, may each have up to 20 inverter units, may each have up to 50 inverter units, may each have up to 100 inverter units, may each have up to 200 inverter units, may each have up to 500 inverter units or may each have even more inverter units.

Each of said module groups may have a module control input connected to all the control inputs of the inverter units in the module group and a module data output connected to all the data outputs of the inverter units in the module group.

The formation of module groups from multiple inverter units may be advantageous in order to reduce line lengths within the data transmission system. The line lengths within a module group may be comparatively short. As long line lengths are accompanied in particular by high line capacitances, reducing the line lengths can increase the transmission rate of the data transmission system. This is advantageous in particular—but not exclusively—for the data line if the inverter units have the aforementioned output switching elements.

In one advantageous development of the invention, there may be provision for the data transmission system to have precisely one data line for each of the module groups.

The control device may have a logic input gate, preferably an OR gate, the input side of which is connected to the individual data lines of the module groups and the output side of which provides a single, combined data line for the further processing within the control device.

The input gate can therefore be used to recombine the initially parallel-running data lines in the control device.

In one advantageous development of the invention, there may be provision for each of the module groups to have a logic output gate, preferably an OR gate, the input side of which is connected to the individual data outputs of the inverter units in the module group and the output side of which is connected to the module data output of the module group.

This allows the transmission rate for the communication between the inverter units and the control line to be increased further.

To lessen the influence of the load current, there may optionally also be provision, according to one refinement of the invention, for buffers in the lines or between the lines and the inputs and outputs of the inverter units and the control device. The buffers are not absolutely necessary, however, and are just a further option to improve the data transmission system.

In one development of the invention, there may be provision for the modular inverter to have at least two inverter modules, wherein the inverter units of the inverter are uniformly distributed over the at least two inverter modules, and wherein the inverter modules are connected to form a series arrangement in order to collectively generate the AC voltage between the primary supply terminals for the primary load that can be connected to the circuit arrangement.

There may in particular be provision for each inverter module to have a respective first supply output and a second supply output. To connect the inverter modules to form said series arrangement, the second supply output of the first inverter module may preferably be connected to the first supply output of the second inverter module, the AC voltage for supplying electric power to the primary load finally being able to be present between the first supply output of the first inverter module and the second supply output of the second inverter module.

Many electrical load arrangements have not only a primary load but also one or more secondary loads. By way of example, electric cars require not only the drive motors, which can be regarded as primary loads, but also secondary loads, such as an air-conditioning system, headlamps, an entertainment system or radio, etc., to be supplied with electric power. The supply of power to such secondary loads is usually provided by means of a secondary voltage, which is lower than the AC operating voltage—in electric cars often by means of a DC voltage of 12 V or 48 V. Providing the secondary voltage besides the AC operating voltage is comparatively complex.

According to one refinement of the invention, the inverter modules may optionally have a secondary supply terminal arranged between them. The control device may finally be designed to configure the inverter units of the inverter modules in such a way that a secondary voltage is produced between the secondary supply terminal and one of the primary supply terminals to supply power to a secondary load that can be connected to the circuit arrangement.

Preferably, the control device may be designed to adjust the secondary voltage independently of the AC voltage generated for the primary load by appropriately configuring the inverter modules or the inverter units thereof.

The secondary load may, in principle, be any electrical load or may be a group of electrical loads. The secondary load is preferably an electrical load that can be operated independently of the primary load.

The secondary load may be able to be connected to the secondary supply terminal and at least one of the primary supply terminals by any means. By way of example, the secondary load may be attached to said supply terminals directly or may be attached to the supply terminals via an electrical line or busbar connected to the secondary load. The circuit arrangement may in some cases also be able to be mechanically connected to the secondary load, for example may be connected to a housing part of the secondary load by force fit, form fit and/or material bond.

The secondary load is preferably not intended to be understood as a component of the circuit arrangement.

The secondary load is preferably an electrical load that can be operated with a DC voltage, preferably a secondary load of an electric vehicle, in particular an electric car, such as for example an air-conditioning system, a headlamp or an entertainment system.

The secondary voltage is preferably a voltage with a lower amplitude than that of the AC voltage for supplying power to the primary load.

The proposed circuit arrangement can be used to generate the secondary voltage for supplying power to the secondary load independently of the AC voltage of the primary load. This is advantageous because the AC voltage of the primary load is often dependent on the present operating state of the primary load—for example on the speed of travel in the case of an electric motor of an electric vehicle. The proposed refinement of the circuit arrangement can be used to continue to ensure a reliable supply of power to the secondary load even for low amplitudes of the AC voltage and/or for low frequencies of the AC voltage. As such, for example a secondary load of an electric vehicle may still be able to be reliably operated with the secondary voltage by the proposed circuit arrangement even when the electric vehicle is travelling at very low speeds or is at a standstill.

According to one refinement of the invention, there may be provision for the circuit arrangement to have a second inverter, having a third primary supply terminal and a fourth primary supply terminal, between which a second AC voltage for supplying electric power to the primary load is present.

Preferably, the third primary supply terminal of the second inverter is connected to the second primary supply terminal of the aforementioned first inverter. The inverters may thus be connected in a series arrangement.

The primary load may therefore in particular be able to be operated with three phases by virtue of the primary load being connected to the first primary supply terminal, the second primary supply terminal, which is connected to the third primary supply terminal, and the fourth primary supply terminal, or being attached to said supply terminals.

In principle, the second inverter may be in any form. The second inverter therefore also does not necessarily have to be configurable. Preferably, however, the second inverter is of the same design as the aforementioned first inverter. Features and advantages described hereinbefore and hereinafter for one of the inverters may also be transferable to the other inverter. This also applies, in principle, to the inverter modules of the inverters and the inverter units of the inverter modules.

There is preferably the possibility of providing a symmetrical three-phase voltage for supplying electric power to the primary load between the primary supply terminals of the inverters.

In one refinement of the invention, there may be provision for the circuit arrangement to have a rectifier for providing a DC voltage for supplying electric power to the secondary load. In principle, the secondary load may also be able to be operated directly with an AC voltage, however—depending on the application or type of the secondary load. Preferably, the secondary load is supplied with said DC voltage, however, for example with a DC voltage between 12 volts and 48 volts. The input side of the rectifier may be connected to the first primary supply terminal, the second primary supply terminal, the fourth primary supply terminal, the secondary supply terminal and/or a secondary supply terminal of one of the inverters in order to generate the DC voltage from one or more of the potential differences produced between said supply terminals connected to the input side.

There may be provision for the rectifier to have an electronic valve arrangement or to be in the form of a valve arrangement, the valve arrangement being connected to the supply terminals attached to the input side. The electronic valve arrangement can be used to ensure that the largest potential difference produced between the supply terminals is always available on the output side to supply power to the secondary load. In particular, there may be provision for diodes for producing the electronic valve arrangement. The use of a diode as a valve element is intended to be understood as merely illustrative and not limiting, however. As an alternative, there may also be provision for a thyristor-based rectifier or a rectifier of different design, for example.

Finally, there may be provision for the control device to be designed to always configure the inverter units in such a way that firstly the AC voltage(s) for supplying electric power to the primary load is/are provided and secondly the electrical potential difference between at least two of the supply terminals is greater than a voltage required for operating the secondary load. If as many of said potential differences as possible are already independently large enough to operate the secondary load, active charge balancing between the DC voltage sources (e.g. battery cells) can take place particularly easily.

In one refinement of the invention, there may additionally be provision for the circuit arrangement to have a DC chopper, the input side of which is connected to the output-side DC voltage of the rectifier, and the output side of which provides a rated operating voltage for operating the secondary load. The DC chopper can be used to generate a regulated DC voltage and to make it available to the secondary load(s). The use of a DC chopper is not absolutely necessary, however, in particular if the secondary load can also be operated with an unregulated DC voltage or if the secondary voltage can already be regulated by the control device.

The invention also relates to a power supply system, comprising a circuit arrangement according to the explanations hereinabove and hereinafter and the DC voltage sources.

A particularly advantageous application of the proposed power supply system relates to the supply of electric power to primary loads of a low-voltage grid or an electric vehicle.

In particular, there may be provision for the power supply system to have an energy storage assembly containing the individual DC voltage sources. However, the DC voltage sources may also each be independent of one another and do not necessarily need to be held in a common energy storage assembly.

In particular, there may be provision for the energy storage assembly to have a battery or to be in the form of a battery, the individual DC voltage sources being in the form of battery cells of the battery.

Advantageously, the modular generation of the AC voltage can optionally be used to provide active state of charge control and/or thermal management by virtue of individual battery cells or battery modules being involved in generating the AC voltage, or being at least intermittently deactivated, as specified by the control device, taking account of present states of charge and/or temperature data.

The invention also relates to an electrical load arrangement, in particular an electric vehicle or a household power grid, comprising a power supply system according to the explanations hereinabove and hereinafter and at least one primary load that is operated with the AC voltage.

In principle, the electrical load arrangement may be any load arrangement that has at least one primary load that can be operated with the AC voltage. By way of example, the load arrangement may be a building to be supplied with electrical energy.

The invention is suitable in particular for supplying electric power to households or industrial installations with a solar battery.

The invention also relates to a method for generating an AC voltage, comprising at least the following method steps:
  operating a modular inverter, which is in the form of a cascade of multiple inverter units, wherein each of the inverter units is connected to a dedicated DC voltage source; and
  operating a control device for configuring the inverter units, wherein the inverter units each take the specification by the control device as a basis for making the associated DC voltage source available on the output side for generating the AC voltage or unavailable, and wherein the inverter units transmit state information about the respective associated DC voltage source to the control device via a data line of a data transmission system, and wherein the control device transmits control signals to configure the inverter units on the basis of the received state information to the inverter units via a control line of the data transmission system, wherein the data transmission system uses a clock generator line and/or synchronization line connected to the control device and all the inverter units.

The proposed method can be used to generate an approximately sinusoidal AC voltage having very low harmonics by adding the individual DC voltages of the DC voltage sources, in particular on the basis of the proposed signal transmission technique for fast and nevertheless simple control of the modular inverter.

The invention is, among other things, advantageously suitable for supplying power to electric motors or power grids containing batteries as energy stores.

The proposed modular inverter can also be used for charging the batteries by way of an external DC or AC power supply.

Finally, the invention also relates to a computer program, comprising control commands that, when the program is executed by a control device (in particular the aforementioned control device), cause said control device to carry out the method described hereinbefore.

Features that have been described in association with one of the subjects of the invention, specifically provided by the circuit arrangement, the power supply system, the load arrangement, the method and the computer program, are also advantageously implementable for the other subjects of the invention. Similarly, advantages that have been mentioned in association with one of the subjects of the invention can also be understood relative to the other subjects of the invention.

At this juncture, it will be pointed out that the term "connected" or "connection" used in the present description and in the patent claims can describe a direct electrical connection for said components, but also an indirect electrical connection for said components (that is to say e.g. via further electrical lines or electronic devices such as resistors, inductances and/or capacitances, etc.). The term "attached", on the other hand, generally indicates a direct connection for said components.

It will additionally be pointed out that terms such as "comprising", "having" or "with" do not exclude other features or steps. Furthermore, terms such as "a/an" or "the" indicating steps or features in the singular do not exclude a plurality of features or steps—and vice versa.

In a puristic embodiment of the invention, however, there may also be provision for the features introduced by the terms "comprising", "having" or "with" in the invention to be enumerated exhaustively. Accordingly, one or multiple enumerations of features in the context of the invention can be considered to be self-contained, for example considered in each case for each claim. The invention can consist for example exclusively of the features mentioned in claim 1.

It will be mentioned that labels such as "first" or "second", etc., are used primarily for reasons of distinguishability from respective apparatus or method features and are not necessarily intended to indicate that features are mutually dependent or related to one another.

Furthermore, it will be emphasized that the values and parameters described in the present case concomitantly include deviations or variations of ±10% or less, preferably ±5% or less, more preferably ±1% or less, and very particularly preferably ±0.1% or less, of the value or parameter respectively mentioned, provided that these deviations are not excluded in practice in the implementation of the invention. The specification of ranges by way of start and end values also encompasses all those values and fractions that are included by the range respectively mentioned, in particular the start and end values and a respective average value.

The invention also relates to a circuit arrangement independent of patent claim 1 for generating a periodic output voltage, comprising at least one modular function generator, which is in the form of a cascade of multiple inverter units, a control device for configuring the inverter units and a data transmission system for signal transmission between the control device and the inverter units, wherein each of the inverter units can be connected to a dedicated DC voltage source, has a control input and a data output and is designed to take control signals from the control device that are received via the control input as a basis for making the associated DC voltage source available on the output side for generating the output voltage with a curve shape specified by the control device or unavailable, wherein the data transmission system has a control line connected to the control device and at least one data line connected to the control device, wherein additionally the control line is connected to the control inputs of the inverter units and the at least one data line is connected to the data outputs of the inverter units, wherein the inverter units are designed to use the at least one data line to transmit state information relating to the respective associated DC voltage source to the control device, and wherein the control device is designed to transmit the control signals to configure the inverter units on the basis of the received state information. The further features of patent claim 1 and of the dependent claims and the features described in the present description relate to advantageous embodiments and variants of this circuit arrangement.

Exemplary embodiments of the invention are described in more detail hereinafter on the basis of the drawings.

The figures each show preferred exemplary embodiments in which individual features of the present invention are illustrated in combination with one another. Features of an exemplary embodiment are also able to be implemented independently of the other features of the same exemplary embodiment, and may accordingly readily be combined with features of other exemplary embodiments by a person skilled in the art to form further expedient combinations and sub-combinations.

In the figures, functionally identical elements are provided with the same reference signs.

Schematically:

Figure 3:
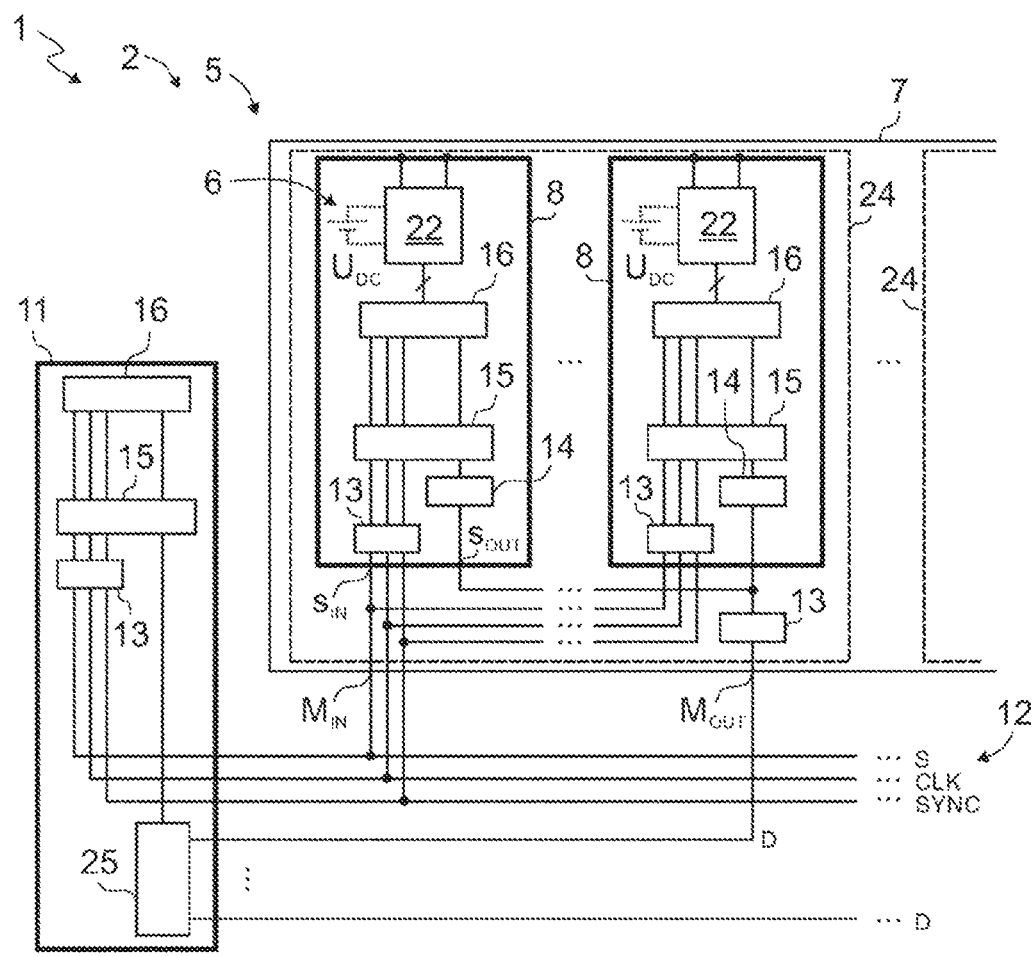
Figure 4:
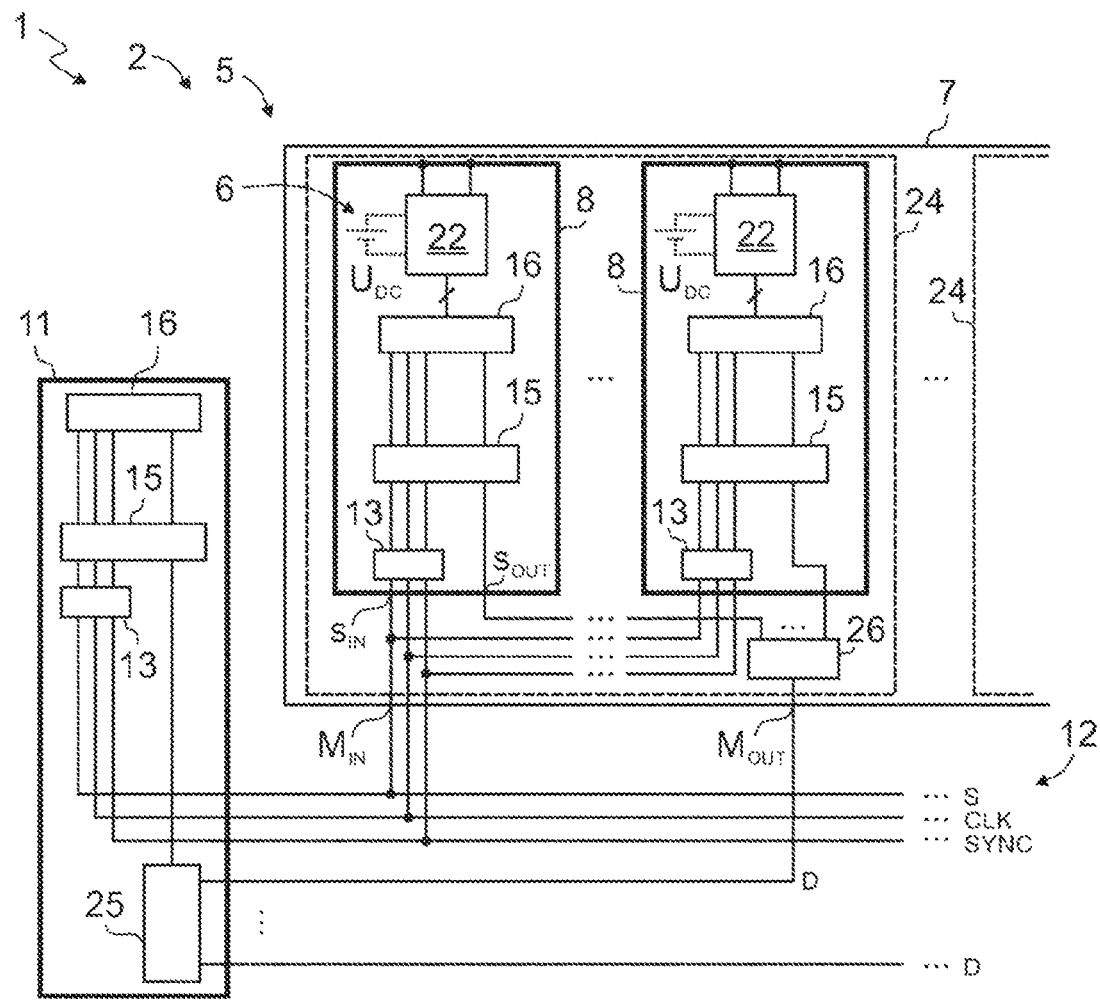

FIG. 3 shows an electrical load arrangement according to the invention with a power supply system according to the invention that has a circuit arrangement according to a second exemplary embodiment of the invention; and FIG. 4 shows an electrical load arrangement according to the invention with a power supply system according to the invention that has a circuit arrangement according to a third exemplary embodiment of the invention.

Figure 1:
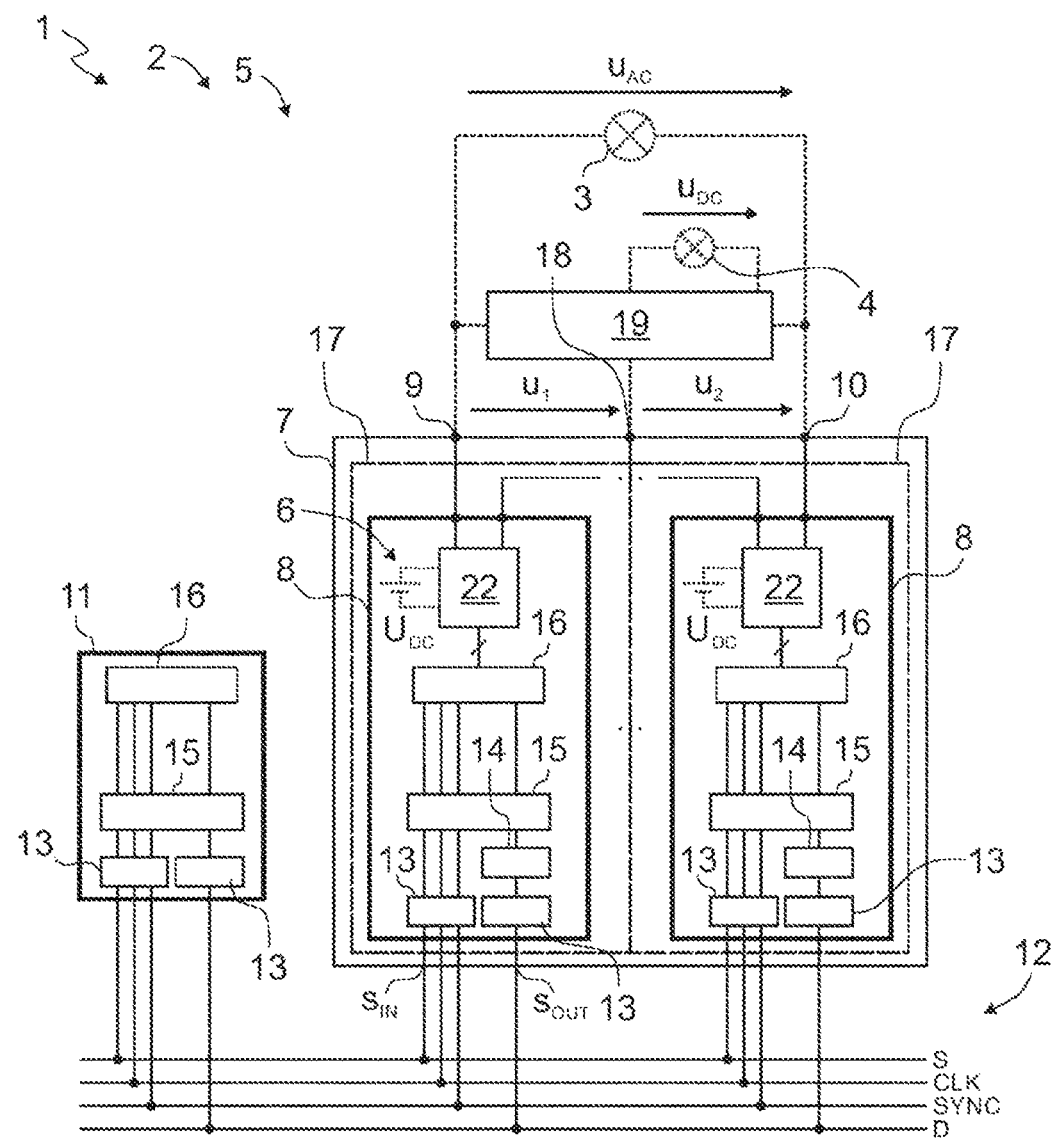
FIG. 1 shows an electrical load arrangement according to the invention with a power supply system according to the invention that has a circuit arrangement according to a first exemplary embodiment of the invention.

FIG. 1 shows an electrical load arrangement 1, which may be a household power grid or an electric vehicle (in particular an electric car), for example. The load arrangement 1 has a power supply system 2 in order to supply electric power to at least one primary load 3 and—optionally—at least one secondary load 4. In principle, the primary load 3 may be any load that can be operated with an AC voltage $u_{AC}$, for example an illuminant, an electrical circuit, a heat source and/or an electric motor. In particular, the primary load 3 may be a conventional household appliance or multiple household appliances. The secondary load 4 may also be able to be operated with an AC voltage, but in some cases also with a DC voltage $u_{DC}$.

The power supply system 2 has a circuit arrangement 5 and multiple DC voltage sources 6. The DC voltage sources 6, which are shown in dashed lines in FIG. 1, may be part of a common energy storage assembly. Such an energy storage assembly is preferably a battery or battery pack, in particular a solar battery, the individual DC voltage sources 6 being in the form of battery cells of the battery or battery pack. In particular, the DC voltage sources 6 may be battery cells of a photovoltaic home storage system or of a high-voltage storage system of an electric vehicle. The energy storage assembly is hereinafter sometimes also referred to as a battery and the DC voltage sources 6 as battery cells. This is merely a preferred application, however, which is not intended to be understood as limiting.

The circuit arrangement 5 is therefore used primarily for generating the AC voltage $u_{AC}$ for supplying power to the primary load 3 and, to this end, has at least one modular inverter 7, which is in the form of a cascade of multiple inverter units 8. Each of the inverter units 8 is able to be connected to a dedicated DC voltage source 6 for this purpose. Appropriate connection or disconnection of the individual DC voltage sources 6 within the series arrangement formed by the inverter units 8 can therefore be used to generate an AC voltage $u_{AC}$, which is preferably approximated to a sinusoidally oscillating voltage as far as possible.

To supply power to the primary load 3, the inverter 7 shown in FIG. 1 has a first primary supply terminal 9 and a second primary supply terminal 10, between which the AC voltage $u_{AC}$ is present.

The circuit arrangement 5 has a control device 11 for configuring the inverter units 8 and a data transmission system 12 for signal transmission between the control device 11 and the inverter units 8. Each of the inverter units 8 has a control input $s_{IN}$ and a data output $s_{OUT}$ and is designed to take control signals from the control device 11 that are received via the control input $s_{IN}$ as a basis for making the associated DC voltage source 6 available on the output side for generating the AC voltage $u_{AC}$ or unavailable.

The data transmission system 12 has a control line S connected to the control device 11 and at least one data line D connected to the control device 11, wherein additionally the control line S is connected to the control inputs $s_{IN}$ of the inverter units 8 and the at least one data line D is connected to the data outputs $s_{OUT}$ of the inverter units 8. The inverter units 8 are designed to use the at least one data line D to transmit state information relating to the respective associated DC voltage source 6 to the control device 11, the control device 11 in turn being designed to transmit the control signals to configure the inverter units 8 on the basis of the received state information.

Said state information may in particular be information relating to the present state of charge, relating to the present temperature or relating to the present "state of health" of the respective DC voltage source 6 or battery cell. To ascertain the state information, an energy storage assembly comprising the DC voltage sources 6 collectively, or the battery, may have a battery management system that records the state information and makes it available to the individual inverter units 8.

In particular, there may be provision for the control device 11 to be designed to generate the AC voltage $u_{AC}$ from the individual voltages $U_{DC}$ of the DC voltage sources 6 by cyclically configuring the inverter units 8 via the control line S. In particular, the control device 11 may be designed to load the inverter units 8 differently on the basis of a respective state of charge of the applicable DC voltage source 6, which is transferred to the control device 11 as state information, with the aim of charge balancing between the DC voltage sources 6. There may also be provision for the control device 11 to at least temporarily exclude the inverter units 8 from generation of the AC voltage $u_{AC}$ on the basis of a respective state of charge, temperature state and/or fault state of the applicable DC voltage source 6, which is transferred to the control device 11 as state information.

Particularly advantageous communication between the control device 11 and the inverter units 8 can be attained if the inverter units 8 transmit the state information only at the request of the control device 11. To this end, the control device 11 can request the state information of a respective inverter unit 8 for example by transmitting a unique identifier associated with the applicable inverter unit 8 via the control line S, one of the further lines mentioned hereinafter or in another way.

To lessen the influence of a load current, there may be provision for optional buffers 13 between the respective line and the inputs and outputs of the inverter units 8 and the control device 11.

Finally, the inverter units 8 additionally each have an output switching element 14 that is connected to the data line D via the data output $s_{OUT}$ and that is able to put the data output $s_{OUT}$ into a high-impedance state if the applicable inverter unit 8 does not transmit state information. Conflicts between logic states on the data line D can be avoided particularly easily in this way.

To increase the data rate of the signal and data transmission between the control device 11 and the inverter units 8, there may be provision for a clock generator line CLK in order to provide a synchronous data transmission system 12. Preferably, the control device 11 generates an appropriate clock signal to synchronize the signal transmission on the clock generator line CLK.

Additionally, the data transmission system 12 may have a synchronization line SYNC connected to the control device 11 and all the inverter units 8. The control device 11 may be designed to generate an appropriate synchronization signal on the synchronization line SYNC, wherein the inverter units 8 are designed to finally synchronize or couple a changeover time, at which an output-side voltage change on the respective inverter unit 8 takes place while the AC voltage $u_{AC}$ is being generated, with reception of the synchronization signal.

Preferably, the data transmission system 12 therefore has the four line types shown "control line S", at least one "data line D", "clock generator line CLK" and "synchronization line SYNC".

To improve signal transmission further, there may be provision for the control device 11 and the inverter units 8 to have respective potential-isolating elements 15, preferably digital isolators or optocouplers, in order to facilitate signal transmission via the control line S, the at least one data line D, the clock generator line CLK and/or the synchronization line SYNC in isolated fashion, and therefore also based on different voltage levels, on both sides.

The inverter units 8 and the control device 11 may have data processing modules 16 in order to generate and evaluate the communication signals and in order to connect up the H-bridges, which are mentioned again hereinafter, as specified by the control device. The data processing modules 16 of the control device 11 may be in the form of a master and the data processing modules 16 of the inverter units 8 may each be in the form of a slave.

The proposed data transmission system 12 can be used to provide a particularly advantageous communication capability between the control device 11 and the inverter units 8 (or between the respective data processing modules 16 thereof), which means that an AC voltage $u_{AC}$ of particularly high quality can be produced as a result of the advantageous exact synchronization capability.

Optionally, in particular if not only the primary load 3 but also a secondary load 4 is meant to be supplied with a secondary voltage $u_1$, $u_2$, the modular inverter 7 may be broken down into at least two inverter modules 17, over which the inverter units 8 are distributed, preferably are uniformly distributed, and which are connected to one another to form a series arrangement in order to collectively generate the AC voltage $u_{AC}$ between the primary supply terminals 9, 10 for the primary load 3. The inverter modules 17 may have a secondary supply terminal 18 arranged between them. The control device 11 may finally be designed to configure the inverter units 8 of the inverter modules 17 in such a way that at least one secondary voltage $u_1$, $u_2$ is produced between the secondary supply terminal 18 and one of the primary supply terminals 9, 10 to supply power to the secondary load 4.

If a DC voltage $u_{DC}$ is required for operating the secondary load 4, there may preferably also be provision for a rectifier 19, the input side of which is connected to the first primary supply terminal 9, to the second primary supply terminal 10 and to the secondary supply terminal 18, in order to generate the desired DC voltage $u_{DC}$ from one or more of the potential differences $u_1$, $u_2$, $u_{AC}$ produced between said supply terminals 9, 10, 18 connected to the input side. Preferably, the rectifier 19 may have an electronic valve arrangement, in particular with diodes as valve units. In some cases, there may also be provision for a DC chopper in order to generate a regulated DC voltage.

Figure 2:
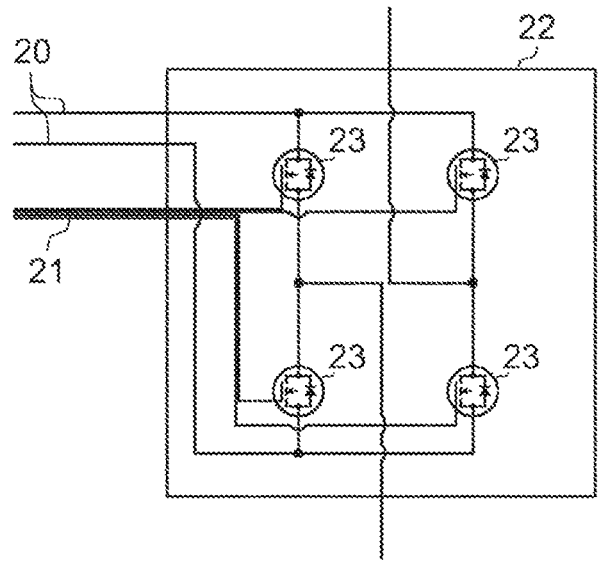
FIG. 2 shows an H-bridge circuit of an illustrative inverter unit of the inverter of a circuit arrangement according to the invention.

The cascaded inverter units 8 may be connected in any way, in principle, in order to connect up the DC voltage sources 6 to one another as specified. An illustrative design is shown in FIG. 2. Each inverter unit 8 may have supply lines 20 that can be connected to the battery cells or DC voltage sources 6. Furthermore, the inverter units 8 have communication lines 21 that can be connected to the data processing module 16 of the inverter unit 8 and/or to the control device 11 of the circuit arrangement 5.

The inverter units 8 may in particular each have an H-bridge circuit 22 comprising four power-electronics switching elements 23 that can be configured by the control device 11 or the control module 16. By way of example, the power-electronics switching elements 23 may be in the form of semiconductor devices, in particular in the form of MOSFETs indicated in FIG. 2. Appropriate configuration of the switching elements 23 can be used to specify in each case three possible voltage levels (0, +$U_{DC}$ and -$U_{DC}$) on the output side.

A disadvantage of the proposed output switching elements 14 may be a low transmission rate on the data line D, in particular for longer line lengths, as comparatively high line capacitances may then be produced. In order to increase the data transmission rate, there may be provision for a combination of multiple inverter units 8 in a common module group 24, as shown in FIG. 3.

Some details, in particular output-side details, such as the interconnection with the primary load 3 and the optional secondary load 4, are not shown in FIGS. 3 and 4 in order to simplify matters.

The circuit arrangement 5 may have multiple instances of said module groups 24, each of the module groups 24 having a module control input $M_{IN}$ connected to all the control inputs $s_{IN}$ of the inverter units 8 of the module group 24 and a module data output $M_{OUT}$ connected to all the data outputs $s_{OUT}$ of the inverter units 8 of the module group 24. The line length within the respective module group 24 may be significantly reduced. The individual data outputs $s_{OUT}$ of the inverter units 8 of a module group 24 may be combined or interconnected within the module group 24 without difficulty.

Preferably, there is provision in the data transmission system 12 for precisely one data line D for each of the module groups 24. The control device 11 may finally have a logic input gate 25, preferably an OR gate, the input side of which is connected to the individual data lines D of the module groups 24 and the output side of which provides a single, combined data line for the further processing within the control device 11.

This allows the data transmission via the data line D to be significantly speeded up overall.

To increase the transmission rate via the data line D further, there may additionally be provision for a further refinement, shown in FIG. 4, according to which each of the module groups 24 has a logic output gate 26, preferably also an OR gate, the input side of which is connected to the individual data outputs $s_{OUT}$ of the inverter units 8 of the module group 24 and the output side of which is connected to the module data output $M_{OUT}$ of the module group 24.

The invention claimed is:

1. A circuit arrangement for generating an AC voltage, comprising:
    at least one modular inverter including a cascade of multiple inverter units;
    a control device for controlling the inverter units; and
    a data transmission system configured for signal transmission between the control device and the inverter units,
    wherein each of the inverter units is connectable to a respective DC voltage source and has a control input configured to receive control signals from the control device for making the respective DC voltage source available on an output side of the respective inverter unit and generating the AC voltage,
    wherein the data transmission system has a control line connected to the control device and at least one data line connected to the control device,
    wherein each of the inverter units has a data output, wherein the control line is connected to the control inputs of the inverter units and the at least one data line is connected to the data outputs of the inverter units,
    wherein each of the inverter units is configured to use the at least one data line to transmit state information relating to the respective DC voltage source to the control device, and
    wherein the control device is configured to transmit the control signals to control the inverter units based on the received state information, and
    wherein a subset of the inverter units is combined to form a common module group,
    wherein the circuit arrangement has a plurality of said common module groups, and
    wherein each of the common module groups has a module control input connected to all the control inputs of the inverter units in the respective common module group and a module data output connected to all the data outputs of the inverter units in the common module group,
    wherein the data transmission system has one data line for each of the respective common module groups,
    wherein the control device has a logic input gate including an input side which is connected to the data lines and an output side which provides a single, combined data line for further processing within the control device, and
    wherein each of the common module groups has a logic output gate including an input side which is connected to the data outputs of the inverter units in the respective common module group and an output side which is connected to the module data output of the respective common module group.

2. The circuit arrangement as claimed in claim 1, wherein the control device is configured to generate the AC voltage from the individual voltages of the DC voltage sources by cyclically controlling the inverter units via the control line, wherein the control device is further configured to control the inverter units differently based on a respective state of charge of the respective DC voltage source, which is transferred to the control device as state information for charge balancing between the DC voltage sources.

3. The circuit arrangement as claimed in claim 1, wherein the control device is configured to generate the AC voltage from the individual voltages of the DC voltage sources by cyclically controlling the inverter units via the control line, wherein the control device is further configured to at least temporarily exclude the inverter units from generation of the AC voltage based on a respective state of charge, temperature state or fault state of the respective DC voltage source, which is transferred to the control device as state information.

4. The circuit arrangement as claimed in claim 1, wherein each of the inverter units is configured to transmit the state information only at the request of the control device, wherein the control device is configured to request the state information of a respective inverter unit by transmitting a unique identifier associated with the respective inverter unit via the control line.

5. The circuit arrangement as claimed in claim 1, wherein each of the inverter units has an output switching element that is connected to the data line via the data output and that is configured to put the data output into a high-impedance state if the respective inverter unit does not transmit state information.

6. The circuit arrangement as claimed in claim 1, wherein the data transmission system has a clock generator line connected to the control device and all of the inverter units, and wherein the control device is configured to generate a clock signal to synchronize the signal transmission between the control device and the inverter units on the clock generator line.

7. The circuit arrangement as claimed in claim 1, wherein the data transmission system has a synchronization line connected to the control device and all of the inverter units, and wherein the control device is configured to generate a synchronization signal on the synchronization line, and wherein the inverter units are configured to synchronize a changeover time, at which an output-side voltage change on the respective inverter unit occurs while the AC voltage is being generated, and in response to reception of the synchronization signal.

8. The circuit arrangement as claimed in claim 1, wherein the control device and the inverter units have respective potential-isolating elements to facilitate signal transmission via the control line, the at least one data line, a clock generator line or a synchronization line in an isolated fashion and based on different voltage levels.

9. The circuit arrangement as claimed in claim 1, wherein the at least one modular inverter includes a plurality of modular inverters, wherein the cascade of multiple inverter units are uniformly distributed over the plurality of modular inverters, and wherein the plurality of modular inverters are connected to form a series arrangement in order to collectively generate the AC voltage between two output-side primary supply terminals of the series arrangement for a primary load that is connectable to the circuit arrangement, wherein the plurality of modular inverters have a secondary supply terminal arranged therebetween, and wherein the control device is configured to control the inverter units of the plurality of modular inverters in a way that a secondary voltage is produced between the secondary supply terminal and one of the primary supply terminals to supply power to a secondary load connected to the circuit arrangement.

10. A power supply system, comprising the circuit arrangement as claimed in claim 1 and the DC voltage sources being in a form of battery cells of a battery.

11. An electrical load arrangement for an electric vehicle or household power grid, comprising the power supply system as claimed in claim 10 and at least one primary load that is operated using the AC voltage.

12. A method for generating an AC voltage in a circuit arrangement, comprising at least the following method steps:

operating a modular inverter including a cascade of multiple inverter units, wherein each of the inverter units is connected to a respective DC voltage source;

operating a control device for controlling the inverter units, wherein each of the inverter units has a control input configured to receive control signals from the control device for making the respective DC voltage source available on an output side of the respective inverter unit and generating the AC voltage, wherein each of the inverter units transmit state information about the respective DC voltage source to the control device via a data line of a data transmission system, and wherein the control device transmits the control signals to control the inverter units based on the received state information from the inverter units via a control line of the data transmission system; and combining a subset of the inverter units to form a common module group, wherein the circuit arrangement has a plurality of said common module groups, and wherein each of the common module groups has a module control input connected to all the control inputs of the inverter units in the respective common module group and a module data output connected to data outputs of the inverter units in the respective common module group, wherein the data transmission system has one data line for each of the common module groups, wherein the control device has a logic input gate including an input side which is connected to the data lines and an output side which provides a single, combined data line for further processing within the control device, and wherein each of the module groups has a logic output gate including an input side which is connected to the data outputs of the inverter units in the respective common module group and an output side which is connected to the module data output of the respective common module group.

* * * * *